United States Patent
Contractor et al.

(10) Patent No.: US 11,157,074 B2
(45) Date of Patent: Oct. 26, 2021

(54) PRESENTING ASSESSMENT CONTENT TO A USER

(71) Applicant: International Business Machines Corporation, Armonk, NY (US)

(72) Inventors: Danish Contractor, Gurgaon (IN); Kuntal Dey, Vasant Kunj (IN); Sreekanth L. Kakaraparthy, Bangalore (IN); Seema Nagar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 564 days.

(21) Appl. No.: 15/833,119

(22) Filed: Dec. 6, 2017

(65) Prior Publication Data
US 2019/0171284 A1 Jun. 6, 2019

(51) Int. Cl.
| G06F 3/00 | (2006.01) |
| G06F 3/01 | (2006.01) |
| G09B 7/00 | (2006.01) |
| G06F 3/0483 | (2013.01) |
| G09B 5/02 | (2006.01) |

(52) U.S. Cl.
CPC ............ G06F 3/013 (2013.01); G06F 3/0483 (2013.01); G09B 5/02 (2013.01); G09B 7/00 (2013.01)

(58) Field of Classification Search
CPC ...................................................... G06F 3/013
USPC ........................................................ 434/362
See application file for complete search history.

(56) References Cited

U.S. PATENT DOCUMENTS

| 2002/0182573 A1 | 12/2002 | Watson |
| 2013/0137076 A1 | 5/2013 | Perez et al. |
| 2014/0335497 A1 | 11/2014 | Gal et al. |
| 2015/0017626 A1 | 1/2015 | Basson et al. |
| 2017/0084190 A1 | 3/2017 | Devlin |

FOREIGN PATENT DOCUMENTS

WO    2013126812 A1    8/2013

OTHER PUBLICATIONS

Xu, S. et al., "Personalized online document, image and video recommendation via commodity eye-tracking," In ACM Proceedings of the 2008 ACM conference on Recommender Systems, Oct. 2008, pp. 83-90.

Buscher, G. et al., "Eye movements as implicit relevance feedback," In ACM CHI'08 Extended Abstracts on Human Factors in Computing Systems, Apr. 2008, pp. 2991-2996.

Asteriadis, S., et al., "Estimation of behavioral user state based on eye gaze and head pose—application in an e-learning environment," Multimedia Tools and Applications, vol. 41, No. 3, 2009, pp. 469-493.

(Continued)

*Primary Examiner* — Kesha Frisby
(74) *Attorney, Agent, or Firm* — Cuenot, Forsythe & Kim, LLC

(57) ABSTRACT

Educational content can be presented to a user via a display. Eye movement of the user while the user gazes at the educational content can be monitored. Based, at least in part, on the monitoring the eye movement of the user while the user gazes at the educational content, a time when to present assessment content to the user can be determined. The assessment content can be presented to the user at the determined time.

20 Claims, 4 Drawing Sheets

(56) References Cited

OTHER PUBLICATIONS

Buscher, G. et al., "Attentive documents: Eye tracking as implicit feedback for information retrieval and beyond," ACM Transactions on Interactive Intelligent Systems (TiiS), vol. 1, No. 2, 2012, p. 9.
Biedert, R., et al., "The eyebook—using eye tracking to enhance the reading experience," Informatik-Spektrum, vol. 33, No. 3, 2012, pp. 272-281.
Kunze, K. et al., "Towards inferring language expertise using eye tracking," in CHI'13 Extended Abstracts on Human Factors in Computing Systems, Apr. 2013, pp. 217-222.
Biedert, R. et al., "A robust realtime reading-skimming classifier," In Proceedings of the Symposium on Eye Tracking Research and Applications, Mar. 2012, pp. 123-130.
Moro, R. et al., "Utilizing Gaze Data in Learning: From Reading Patterns Detection to Personalization," In UMAP Workshops, Jan. 2015, 4 pg.
Shishido, M., "E-learning Material Development for Improving Reading Proficiency: From a Research Perspective on Eye Tracking," In J. Johnston (Ed.), Proc. of EdMedia 2017, pp. 552-557.

FIG. 2

| Line numbers | Sub parts of concept | Mandatory line range |
|---|---|---|
| 1-200 | Work → Definition of work | 1-200 |
| 201-400 | Work → Example 1 | |
| 401-600 | Work → Example 2 | |
| 601-800 | Power → Definition of power | 601-800 |
| 801-1000 | Power → Example 1 | |
| 1001-1200 | Power → Example 2 | |
| 1201-1400 | Energy → Definition of energy | 1201-1400 |
| 1401-1600 | Energy → Example 1 | |
| 1601-1800 | Energy → Example 2 | |

200

210: 212, 214, 216
220: 222, 224, 226
230: 232, 234, 236
240, 242, 244

PRESENTING ASSESSMENT CONTENT TO A USER

BACKGROUND

The present invention relates to data processing and, more particularly, analyzing a user's consumption of electronically presented content.

With the continued proliferation of Internet connected electronic devices, use of electronically presented content continues to grow in the field of education. Indeed, online education is a rapidly growing field. Online education is a type of educational instruction that is delivered via the internet to students who can access educational content using various types of computing devices. During the last decade, online degrees and courses have become a popular alternative for a wide range of students, including those who desire to continue working full-time or raising families. Typically, online degree programs and courses are offered via a host school's online learning platform, although some programs are delivered using alternative technologies.

SUMMARY

A method includes presenting educational content to a user via a display. The method also can include monitoring eye movement of the user while the user gazes at the educational content. The method also can include, based, at least in part, on the monitoring the eye movement of the user while the user gazes at the educational content, determining, using a processor, a time when to present assessment content to the user. The method also can include presenting the assessment content to the user at the determined time.

A system includes a processor programmed to initiate executable operations. The executable operations include presenting educational content to a user via a display. The executable operations also can include monitoring eye movement of the user while the user gazes at the educational content. The executable operations also can include, based, at least in part, on the monitoring the eye movement of the user while the user gazes at the educational content, determining a time when to present assessment content to the user. The executable operations also can include presenting the assessment content to the user at the determined time.

A computer program includes a computer readable storage medium having program code stored thereon. The program code is executable by a processor to perform a method. The method includes presenting, by the processor, educational content to a user via a display. The method also can include monitoring, by the processor, eye movement of the user while the user gazes at the educational content. The method also can include, based, at least in part, on the monitoring the eye movement of the user while the user gazes at the educational content, determining, by the processor, a time when to present assessment content to the user. The method also can include presenting, by the processor, the assessment content to the user at the determined time.

BRIEF DESCRIPTION OF THE DRAWINGS

FIG. 2 depicts an example functional data structure that defines various portions of a section of educational content.

DETAILED DESCRIPTION

Figure 1:
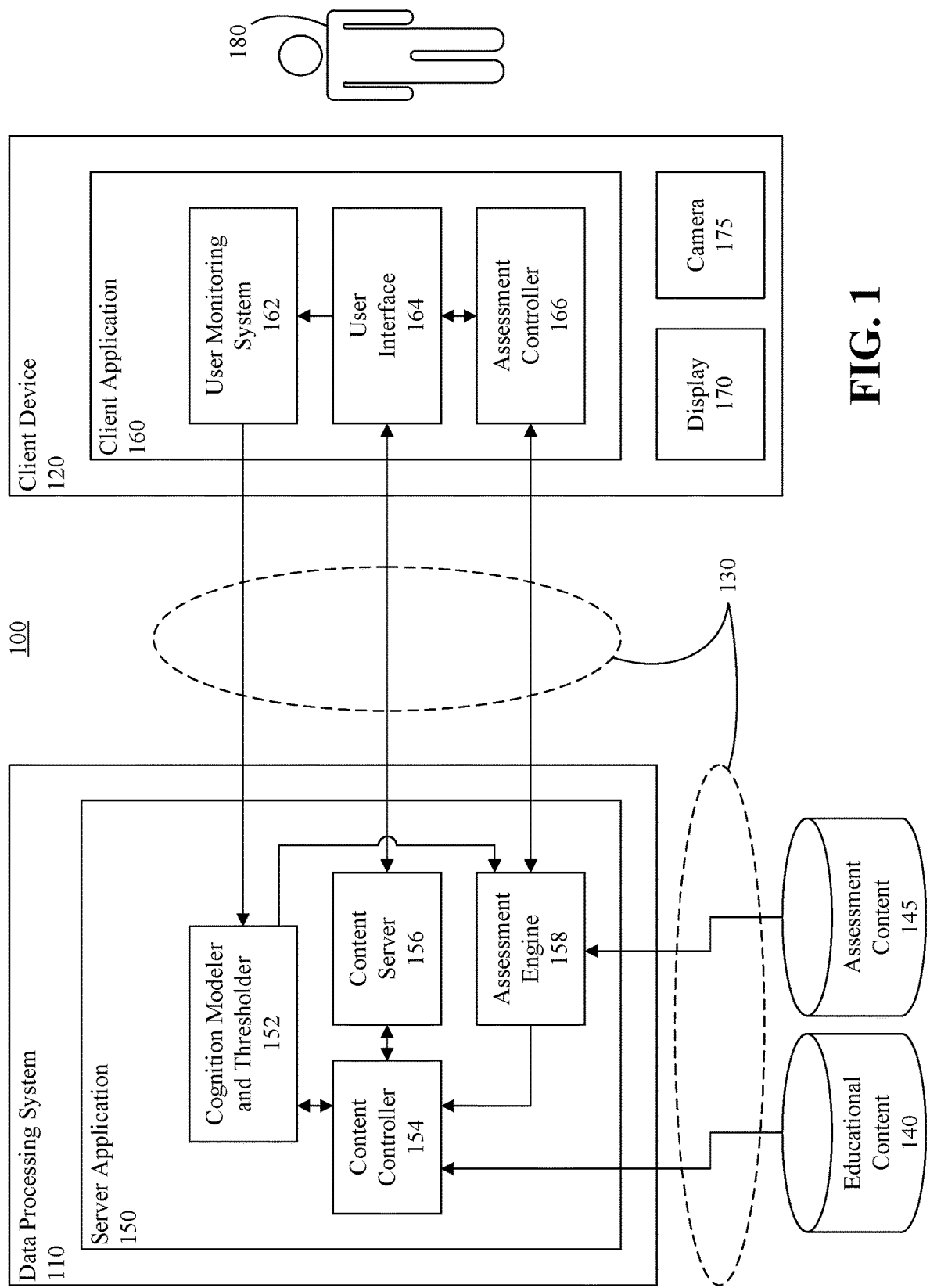
FIG. 1 is a block diagram illustrating example software architecture for an assessment system.

This disclosure relates to presenting educational content and, more particularly, to presenting assessment content to a user. In accordance with the inventive arrangements disclosed herein, educational content can be presented to a user. Eye movement of the user while the user gazes at the educational content can be monitored. Facial expressions and/or emotions expressed by the user while gazing at the educational content also can be monitored. Based, at least in part, on monitoring the eye movement of the user and, optionally, monitoring the facial expressions and/or emotions of the user, a time when to present assessment content to the user can be determined. The assessment content can be presented to the user at the determined time. The assessment content presented to the user can be dynamically selected based, at least in part, on the monitoring the eye movement of the user while the user gazes at the educational content. The assessment content also can be dynamically selected based, at least in part, on the facial expressions and/or emotions of the user.

Several definitions that apply throughout this document now will be presented.

As defined herein, the term "educational content" means content configured to be presented to a user to aid the user in learning.

As defined herein, the term "assessment content" means content configured to be presented to a user and to which the user responds, and for which the user's responses are analyzed to assess the user's comprehension of educational content. For example, assessment content can include questions configured to assess the user's comprehension of educational content.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "hardware server" means a processing system including at least one processor and memory that provides shared services to one or more client devices.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating example software architecture for an assessment system (hereinafter "system") 100. The system 100 can include a data processing system 110, for example one or more hardware servers, and at least one client device 120 communicatively linked to the data processing system 110 via at least one communication network 130. The communication network 130 is the medium used to provide communications links between various devices and data processing systems connected together within the system 100. The communication network 130 may include connections, such as wire, wireless communication links, or fiber optic cables. The communication network 130 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

The data processing system 110 also can be communicatively linked to a plurality of data sources via the communication network 130, for example an educational content 140 data source and an assessment content 145 data source. The data sources can be databases or any functional data structures suitable for storing content 140, 145. The educational content 140 can include educational materials, for example text, images, audio and/or video content, used to teach one or more educational subjects to users. The assessment content 145 can include questions used to evaluate users' comprehension of the educational content 140.

The data processing system 110 can include a server application 150. The server application 150 can include a cognition modeler and thresholder 152, a content controller 154, a content server 156 and an assessment engine 158. The client device 120 can include a client application 160. The client application 160 can include a user monitoring system 162, a user interface 164 and an assessment controller. The client device further can include, or can be communicatively linked to, at least one display 170 and at least one camera 175 (or other suitable gaze tracking hardware).

FIG. 2 depicts an example functional data structure (e.g., data table) 200 that defines various sections 210, 220, 230 and sub-parts 212, 214, 216, 222, 224, 226, 232, 234, 236 of educational content 140 (FIG. 1). The sub-parts 212, 214, 216, 222, 224, 226, 232, 234, 236 can be indicated in respective records (e.g., rows) of the functional data structure 200. In this example, the sections 210, 230, 230 can be sections of a chapter of an electronic book directed to work, power and energy. The functional data structure 200 also can define sections and sub-parts for other chapters of the book, or sections and sub-parts for other chapters can be defined in their own respective tables.

In the present example, the sections include a first section 210 directed to work, a second section 220 directed to power and a third section 230 directed to energy. Each of the sections 210, 220, 230 can include sub-parts (e.g., sub-sections). For instance, the first section 210 can include a sub-part 212 directed to the definition of work, a sub-part 214 directed to a first example related to work, and a sub-part 216 directed to a second example related to work. Similarly, the second section 220 can include a sub-part 222 directed to the definition of power, a sub-part 224 directed to a first example related to power, and a sub-part 226 directed to a second example related to power. Likewise, the third section 230 can include a sub-part 232 directed to the definition of energy, a sub-part 234 directed to a first example related to energy, and a sub-part 236 directed to a second example related to energy.

The functional data structure 200 can include a plurality of columns. For example, the functional data structure can include a column 240 for fields that indicate line numbers. The line numbers can indicate boundaries of a corresponding sub-part. In illustration, the line numbers 1-200 can indicate that lines 1 and 200 are the boundaries of the sub-part 212 describing the definition of work, the line numbers 201-400 can indicate that lines 201 and 400 are the boundaries of the sub-part 214 describing the first example of work, the line numbers 401-600 can indicate that lines 401 and 600 are the boundaries of the sub-part 216 describing the second example of work, and so on. The functional data structure 200 can include a column 242 for fields that indicate the sub-parts of concepts described at the corresponding line numbers. Further, the functional data structure 200 can include a column 244 for fields that indicate mandatory lines to be read for each section 210, 220, 230 of the educational content.

In one arrangement, a system administrator, author of the educational content 140 or another person can create the functional data structure 200. In another arrangement, a cognitive system (e.g., IBM® Watson™) can process the educational content 140, identify the sections and sub-parts, and automatically create the functional data structure 200.

Referring to FIGS. 1 and 2, in operation, via the user interface 164 presented on the display 170, a user 180 can choose to access educational content 140. For example, the user interface 164 can present a menu of available educational content 140. From the menu, the user 180 can select the desired educational content, for example an electronic book and a chapter of that book. In response, the user interface 164 can communicate a content request to the content server 156. The content server 156 can interface with the content controller 154 to access the educational content 140 from an appropriate data source. In one arrangement, the content controller 154 can determine which section of the requested educational content 140 to present to the user 180. For example, if the user 180 has not previously accessed the selected educational content 140, the content controller 154 can choose to begin presentation of the educational content 140 in a first section 210 of that educational content 140. In illustration, if the user has requested to access the chapter on work, power and energy, the content controller 154 can choose to present lines 1-200 (section 210, sub-part 212) of that chapter, beginning with the definition of work.

If, however, the user has previously accessed the selected educational content 140, the content controller 154 can choose to begin presentation of the educational content 140 at a section of the educational content 140 where the user previously left off, or at a section of the educational content 140 immediately following a section in which the user 180 has demonstrated a minimum level of comprehension, for example based on a previous assessment of the user's comprehension. In any case, the content server 156 can communicate the selected educational content 140 to the user interface 164. The user interface 164 can present the educational content 140 to the user 180 via the display 170, for example beginning at a section of the educational content 140 selected by the content controller 154. The user interface 164 can provide content navigation controls (e.g., buttons, etc.) to enable the user 180 to navigate to desired sections/lines of the educational content 140.

While the user gazes at (e.g., reads or views) the educational content 140 presented on the display 170, the user monitoring system 162 can monitor various gestures of the user and generate corresponding user gesture data. For example, the user monitoring system 162 can receive from the camera 175 (or other gaze tracking hardware), in real time, image data representing images/video of the user 180 captured by the camera 175. The user monitoring system 162 can, in real time, process the image data to determine at which portion of the educational content 140 the user is gazing at any moment. For example, the user monitoring system 162 can, in real time, identify the direction of the user's gaze with respect to the display 170, and determine lines of text, images, etc. of the educational content 140 presented on the display 170 where the user is gazing. The user monitoring system 162 also can determine lengths of time that the user gazes (e.g., reads) at various portions of the educational content 140 (e.g., fixation duration), saccades of the user while the user is gazing the educational content 140 (e.g., saccade length), and regressions (e.g., re-reading) of the user while the user is reading certain portions of the educational content 140. With regard to regressions, the user monitoring system 162 also can determine how many times and/or how frequency the user 180 re-reads those portions (e.g., regression frequency), etc. Further, the user monitoring system 162 can, in real time, process the image data to monitor facial expressions of the user 180 while the user 180 gazes at the educational content 140 and/or monitor emotions expressed by the user 180 while the user gazes at the educational content 140.

In one arrangement, the user monitoring system 162 also can monitor utterances spoken by the user and other sounds (e.g., the user pounding his/her first on a desk, etc.) and generate corresponding user gesture data. In illustration, the client device can include one or more input audio transducers (e.g., microphones) that detect spoken utterances and other sounds, and an audio controller that converts the detected audio signals into digital audio data. For instance, the user monitoring system 162 can receive the digital audio data from the audio controller, and perform speech-to-text analysis on the digital audio data using a voice recognition application or module. The user monitoring system 162 also can process the digital audio data to recognize other sounds using techniques known in the art.

The user monitoring system 162 can communicate the user gesture data to the cognition modeler and thresholder 152. The communicated user gesture data can include the user gesture data generated by processing the captured image data and, optionally, the user gesture data generated by processing the digital audio data. The cognition modeler and thresholder 152 can monitor the user gestures by monitoring and analyzing the user gesture data. Based on monitoring the user gestures, the cognition modeler and thresholder 152 can determine the user's comprehension of various information presented in the educational content 140. In illustration, the cognition modeler and thresholder 152 can include models that correlate various user gestures to a level of comprehension of information.

By way of example, if the user 180 gazes at particular words/phrases for an amount of time exceeding a threshold value, the cognition modeler and thresholder 152 can determine that the user 180 is having difficulty comprehending such words/phrases. Moreover, the cognition modeler and thresholder 152 can assign to the words/phrases a value indicating a comprehension level of the user 180 toward the words/phrases based, at least in part, on the amount of time the user 180 gazes at the words/phrases. For instance, the assigned comprehension level can be lower the longer the time is that the user 180 gazes at the words/phrases, and higher the shorter the time that the user 180 gazes at the words/phrases. Similarly, if the user 180 regresses while reading a passage (e.g., re-reads a certain passage multiple times) or rapidly moves her eyes back and forth (saccade), the cognition modeler and thresholder 152 can determine that the user 180 is having difficulty comprehending the passage, and can assign to the passage a value indicating a comprehension level of the user toward the passage based on the number of times the user re-reads the passage.

In another example, the cognition modeler and thresholder 152 can assign to the words/phrases a value indicating a comprehension level of the user 180 toward the words/phrases based, at least in part, on facial expressions of the user 180 while gazing at the words/phrases. In illustration, if the user 180 exhibits certain facial expressions while gazing at particular words/phrases, the cognition modeler and thresholder 152 can determine that the user 180 is having difficulty comprehending such words/phrases. If, however, the user exhibits other certain facial expressions while gazing at particular words/phrases, the cognition modeler and thresholder 152 can determine that the user 180 is not having difficulty comprehending such words/phrases. For instance, the cognition modeler and thresholder 152 can identify certain features of facial expressions, for instance squinting, eyebrow movement, tightening of lips, a relaxed facial structure, etc. using facial expression identification techniques known in the art. The cognition modeler and thresholder 152 can access a functional data structure (e.g., a data table) that correlates facial expressions to levels of content comprehension. For example, a relaxed facial structure can be correlated with a value representing a high level of comprehension, and squinting and/or tightening of the lips can be correlated with a value representing a low level of comprehension. The cognition modeler and thresholder 152 can identify in the functional data structure data representing identified facial expressions of the user 180, and determine content comprehension values assigned to those identified facial expressions.

In another example, the cognition modeler and thresholder 152 can assign to the words/phrases a value indicating a comprehension level of the user 180 toward the words/phrases based, at least in part, on emotions expressed by the user 180 while gazing at the words/phrases. In illustration, if the user 180 exhibits certain emotions while gazing at particular words/phrases, the cognition modeler and thresholder 152 can determine that the user 180 is having difficulty comprehending such words/phrases. If, however, the user exhibits other certain emotions while gazing at particular words/phrases, the cognition modeler and thresholder 152 can determine that the user 180 is not having difficulty comprehending such words/phrases. For instance, the cognition modeler and thresholder 152 can identify emotions exhibited by the user, for instance joy, contentment, frustration, confusion, etc. using emotion identification techniques known in the art. Such techniques can correlate facial expressions, spoken utterances and other user gestures to various emotions. The cognition modeler and thresholder 152 can access a functional data structure (e.g., a data table) that correlates emotions to levels of content comprehension. For example, joy can be correlated with a value representing a high level of comprehension, and confusion can be correlated with a value representing a low level of comprehension. The cognition modeler and thresholder 152 can identify in the functional data structure data representing identified emotions of the user 180, and determine content comprehension values assigned to those identified emotions.

Based on one or more values indicating the comprehension level of the user 180 toward the words/phrases, the cognition modeler and thresholder 152 can determine a total (i.e., an overall) comprehension level of the user 180 toward the words/phrases. For example, the total comprehension level can be based on the amount of time the user 180 gazes at the words/phrases, facial expressions of the user 180 while gazing at the words/phrases, and/or emotions expressed by the user 180 while gazing at the words/phrases. In illustration, the total comprehension level can be based on a weighted sum of the various values assigned to the words/phrases by the cognition modeler and thresholder 152. The weighting applied to each value can be predetermined weights, though the present arrangements are not limited in this regard.

Further educational content 140 to be presented to the user 180 and/or skipping of presentation of certain educational content 140 to the user 180 can be determined based on the values indicating the comprehension level of the user 180 toward the words/phrases. In illustration, in addition to assigning comprehension values to individual words/phrases, the cognition modeler and thresholder 152 also can assign a total comprehension value to lines 1-200 (FIG. 2, section 210, sub-part 212) of educational content 140 based on the determined comprehension of the user pertaining to the individual words/phrases in that sub-part 212.

Further, the cognition modeler and thresholder 152 can assign words/phrases in the sub-part 212 to a particular reading category based on the user's reading of the words/phrases. For example, if the user 180 skipped particular words/phrases, or was not fixated on those words/phrases, while reading, those words/phrases can be assigned to a first category (e.g., a "skipped" category). If the user 180 read particular words/phrases in a normal manner, for instance the user 180 read the words/phrases at a pace that is typical for the user 180, those words/phrases can be assigned to a second category (e.g., a "normal" category). If the user 180 gazed at particular words/phrases for an amount of time greater than a threshold amount of time, for example amount of time that exceeds an average amount of time the user gazes at words/phrases, those words/phrases can be assigned to a third category (e.g., a "fixated" category).

If the comprehension value determined for the user 180 for the sub-part 212 meets or exceeds a threshold value, the cognition modeler and thresholder 152 can communicate to the assessment engine 158, in real time responsive to the user completing reading of the sub-part 212, an indicator indicating to the assessment engine 158 to present assessment content 145 (e.g., questions) pertaining to the information presented in the section 210 of the educational content 140. In this regard, the assessment content 145 can be presented at the time when it is determined that the user has read lines 1-200 with at least a threshold level of comprehension, which can be determined by the cognition modeler and thresholder 152 based on the eye movement pattern of the user 180, for example based on monitoring regressions, fixations, saccades, etc. of the user's eyes, as well as evolution of the user's facial expressions and emotions. Further, the content controller cognition modeler and thresholder 152 can communicate to the assessment engine 158 one or more indicators indicating aspects of the assessment content 145 that should be presented to the user. For example, such indicators can indicate words/phrases in the "fixated" category, and the assessment engine 158 can select questions directed to the concepts to which those words/phrases are directed.

The assessment engine 158 can process the indicators to select questions from the assessment content 145 that are directed to the words/phrases in the "fixated" category. In this regard, the assessment engine 158 can dynamically select questions from a pool of questions in the assessment content 145 based on the indicators received from the content controller cognition modeler and thresholder 152, and those questions can be selected by matching the learning quality of the user 180 as inferred based on the comprehension value assigned to the words/phrases in the sub-part 212 (e.g., based on eye movement pattern of the user 180 and, optionally, evolution of the user's facial expressions and/or emotions). The questions also can be selected by matching the concepts presented in the questions to the concepts presented in the sub-part 212 on which the user 180 fixated most or otherwise are assigned a comprehension value that is below a threshold value, which can indicate concepts the user 180 understood the least.

The assessment engine 158 can communicate, in real time, the selected questions to the assessment controller 166. Via the user interface 164, the assessment controller 166 can present the selected questions to the user 180. The user 180 can answer the presented questions via the user interface 164. The assessment controller 166 can communicate the user's answers to the assessment engine 158. The assessment engine 158 can determine which questions the user 180 answered correctly and which questions the user answered incorrectly, and generate corresponding results. The assessment engine 158 can communicate the results to the cognition modeler and thresholder 152. The cognition modeler and thresholder 152 can analyze the results and, based on such analysis, determine whether the user has met a threshold level of comprehension of the subject matter.

The cognition modeler and thresholder 152 can communicate the results of the analysis to the content controller 154 in real time. In response, the content controller 154 can determine whether to present further sub-parts 214, 216 of the section 210 to the user 180, or to skip to a next section 220. In illustration, if the user's answers indicate that the user 180 has met a threshold level of comprehension for all concepts covered by the questions, the content controller 154 can determine that sub-parts 214, 216 need not be presented to the user, and select the sub-part 222 of the next section 220 of the educational content 140 for presentation to the user. For example, the content server 156 can automatically present the section 220 beginning at line 601, where sub-part 222 begins. In another example, the content server 156 can present to the user 180, via the user interface 164, a menu including a link to proceed to the section 220, as well as links to sub-parts 214, 216 of the section 210.

Accordingly, the user 180 can choose to proceed to the next section 220 or to read one or both of the sub-parts 214, 216. The menu also can present to the user 180 an option to re-read the sub-part 212.

If, however, the user 180 answered correctly a threshold number of questions pertaining to a first concept, but answered incorrectly a threshold number of questions pertaining to a second concept, the content controller 154 can determine to present additional educational content 140 directed to the second concept. For instance, if the first concept is covered in the sub-part 214 of the section 210 and the second concept is covered in the sub-part 216, the content controller 154 can determine to skip sub-part 214 and direct the content server 156 to present the next present sub-part 216 to the user 180 via the user interface 164. If the user 180 answered incorrectly a threshold number of questions pertaining to the first concept and answered incorrectly a threshold number of questions pertaining to the first concept, the content controller 154 can determine not to skip the sub-parts 214, 216, and direct the content server 156 to present both sub-parts 214, 216 to the user 180, for example sequentially. Optionally, responsive to the cognition modeler and thresholder 152 detecting the user completing reading of each respective sub-part, the cognition modeler and thresholder 152 can initiate the assessment engine 158 to access questions from the assessment content 145 directed concepts in the sub-parts, for example as previously described.

In a further aspect, if the user 180 answers incorrectly a threshold number of the questions, the content controller 154 can access additional education content 140 to supplement the section 210. For example, the content controller 154 can access additional educational content 140 that pertains to concepts covered by the incorrectly answered questions, and direct the content server 156 to present the additional educational content 140 to the user 180. The content controller 154 also can direct the content server 156 to re-present to the user 180 one or more portions of the subparts 212, 214, 216 including concepts to which the incorrectly answered questions were directed. Further, the content controller 154 can direct the content server 156 to highlight, underline, or otherwise emphasize those concepts when re-presented to the user 180.

In a one arrangement, if the comprehension value determined for the user 180 for the sub-part 212 does not meet or exceed a threshold value, the cognition modeler and thresholder 152 can communicate to the content controller 154, in real time responsive to the user completing reading of the sub-part 212, an indicator indicating to the content controller 154 to initiate presentation of a next sub-part 214 of the section 210 to the user 180. Similarly, if the comprehension value determined for the user 180 for the sub-part 214 does not meet or exceed a threshold value, the cognition modeler and thresholder 152 can communicate to the content controller 154, in real time responsive to the user completing reading of the sub-part 214, an indicator indicating to the content controller 154 to initiate presentation of a next sub-part 214 of the section 210 to the user 180.

Responsive to the user 180 completing reading of the section 210, the cognition modeler and thresholder 152 can, in real time, communicate to the assessment engine 158 an indicator indicating to the assessment engine 158 to present assessment content 145 (e.g., questions) pertaining to the information presented in the section 210 of the educational content 140. Further, the cognition modeler and thresholder 152 can communicate to the assessment engine 158 indicators which the assessment engine 158 can process to select indicators indicating aspects of the assessment content 145 that should be presented to the user. For example, such indicators can indicate words/phrases in the "fixated" category, and the assessment engine 158 can select questions directed to the concepts to which those words/phrases are directed. As noted, the content controller 154 can choose to move to a next section 220 of the educational content 140, or to select/re-present for presentation educational content 140 that reinforces concepts the user 180 is having difficulty in comprehending.

The following is an example use case. In this example, assume the user 180 is reading, via the user interface 164 presented on the display 170, sub-part 212 of the section 210 of the educational content 140 directed to "definition of work." Also, assume that the user 180 has not fixated on words/phrases more than expected (e.g., has not fixated on any particular words/phrases more than a threshold period of time), the user 180 has not regressed in her reading, the user's face has remained calm and composed, the user 180 has not shown any facial expression indicating confusion, and the user 180 has read lines 1-200. At this point, the assessment engine 158 can, in real time, present to the user 180, via the assessment controller 166 and user interface 164, two most difficult questions pertaining to the content of sub-part 212, assuming that the questions in the assessment content 145 each are assigned a value indicating a level of difficulty. In this regard, the questions can be presented at the time when it is determined that the user has read lines 1-200 without any facial expression of confusion. If the questions in the assessment content 145 are not assigned values indicating levels of difficulty, the assessment engine 158 can present the user two random questions to pertaining to the content of sub-part 212. If the user 180 answers the questions, the content server 156 can present to the user 180, via the user interface 164, a pop-up window or other user interface item presenting a link for the next section 220, for example a link to a sub-part 222 beginning on line 601. In another arrangement, the content controller 154 can direct the content server 156 to immediately jump to the next section 220, and present the sub-part 222 via the user interface 164 beginning at line 601.

The following is another example use case continuing from the previous example. Assume the user 180 is reading sub-part 222 of section 220 pertaining to "definition of power." Also assume, the cognition modeler and thresholder 152 detects that the user 180 fixates on the phrase "work done per second" in that sub-part 222, the server application 150 detects a frown facial expression, and the server application 150 detects that her reading regresses from the words "per second" to the word "power." Assume the user 180 proceeds reading sub-part 224 of section 220, and the cognition modeler and thresholder 152 detects that she reads lines 801-1000 of sub-part 224 at a normal pace with a calm expression on her face. In response, in real time, the cognition modeler and thresholder 152 can initiate the assessment engine 158 to present to the user 180 at least one question, selected from the assessment content 145, directed to the concept of "work done per second." In this regard, the question(s) can be presented at the time when it is determined that the user has read lines 801-1000 at a normal pace with a calm expression on her face. If the user 180 answers the question correctly, the content server 156 can present to the user 180, via the user interface 164, a pop-up window or other user interface item presenting a link for the next section 230, for example a link to a sub-part 232 beginning on line 1201. In another arrangement, the content controller 154 can direct the content server 156 to immediately jump to the next section 230, and present the sub-part 232 via the user interface 164 beginning at line 1201.

The following is another example use case continuing from the previous example. Assume the user 180 is reading sub-part 232 of section 230 pertaining to "definition of energy." Also assume, the cognition modeler and thresholder 152 detects that the user 180 fixates on the phrase "total work done" with a confused expression on her face. Assume the user 180 proceeds reading sub-part 234 of section 230, beginning at line 1401, and the cognition modeler and thresholder 152 detects that she is still exhibits a facial expression of confusion, and she regresses from line 1600 back to line 1300. In response, in real time, the cognition modeler and thresholder 152 can initiate the assessment engine 158 to present to the user 180 at least one question, selected from the assessment content 145, directed to the concept of "total work done." In this regard, the question(s) can be presented at the time when it is determined that the user still exhibits a facial expression of confusion and has regressed from line 1600 back to line 1300. If the user answers the question incorrectly, the content controller 154 can direct the content server 156 to present sub-part 236 of section 230.

Figure 3:
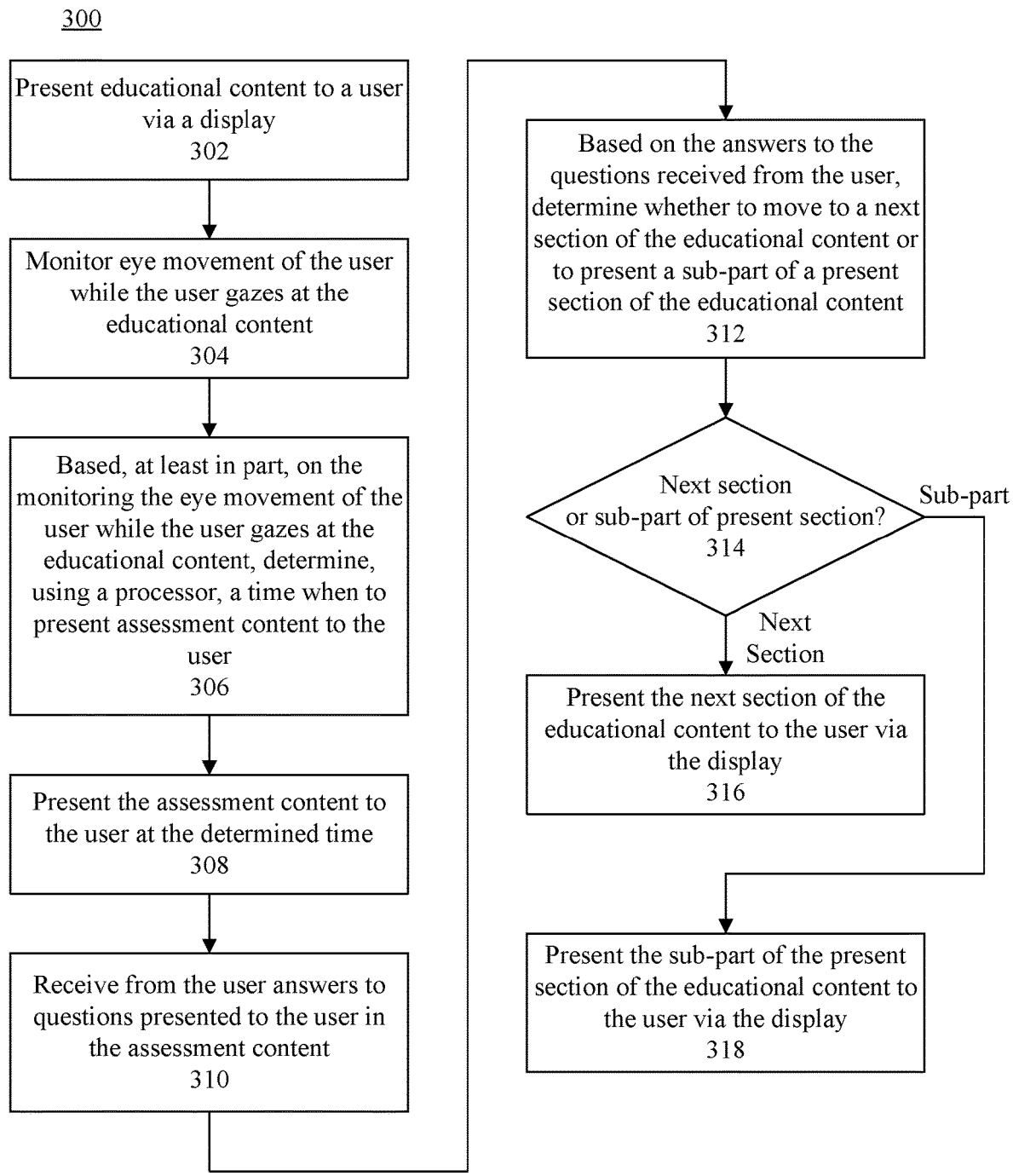
FIG. 3 is a flow chart illustrating an example of a method of presenting assessment content to a user at a determined time.

FIG. 3 is a flow chart illustrating an example of a method 300 of presenting assessment content to a user at a determined time. At step 302, the content server 156 can present education content 140 to a user 180 via the display 170 (e.g., via the user interface 164).

At step 304, the cognition modeler and thresholder 152 can monitor eye movement of the user 180 while the user 180 gazes at the educational content 140. In illustration, the cognition modeler and thresholder 152 can monitor and analyze user gesture data received from the user monitoring system 162 that indicates the user's eye movement. The cognition modeler and thresholder 152 also can monitor facial expressions of the user 180 while the user 180 gazes at the educational content 140 and/or emotions expressed by the user 180 while the user 180 gazes at the educational content 140.

At step 306, based, at least in part, on the monitoring the eye movement of the user 180 while the user 180 gazes at the educational content 140, the cognition modeler and thresholder 152 can determine, using a processor, a time when to present assessment content 145 to the user 180. Such determination also can be based, at least in part, on monitoring facial expressions of the user 180 while the user 180 gazes at the educational content 140 and/or monitoring emotions expressed by the user 180 while the user 180 gazes at the educational content 140. The assessment engine 158 can dynamically select the assessment content 145 based, at least in part, on the monitoring the eye movement of the user 180 while the user gazes at the educational content performed by the cognition modeler and thresholder 152. Further, the assessment engine 158 can dynamically select the assessment content 145 based, at least in part, on the monitoring the facial expressions of the user while the user gazes at the educational content and/or the monitoring the emotions expressed by the user while the user gazes at the educational content performed by the cognition modeler and thresholder 152.

At step 308, the assessment engine 158 can present the assessment content 145 to the user 180. For example, the assessment engine 158 can select questions from the assessment content 145 and communicate the questions to the assessment controller 166 for presentation on the display 170 via the user interface 164.

At step 310, the assessment engine 158 can receive from the user 180 answers to questions presented to the user 180 in the assessment content 145. In illustration, the assessment engine 158 can receive the answers via the user interface 164 and the assessment controller 166. At step 312, based on answers received from the user 180, the content controller 154 can determine whether to move to a next section of the educational content 140 or to present a sub-part of a present section of the educational content 140. Referring to decision box 314, if the content controller 154 determines to move to a next section, at step 316 the content server 156 can skip remaining sub-parts of the present section of the educational content 140 and present the next section of the educational content 140 to the user 180 via the display 170 (e.g., by communicating with the user interface 164). If, however, the content controller 154 determines to present a sub-part of the present section of the educational content 140, at step 318 the content server 156 can present the sub-part of the present section of the educational content 140 to the user 180 via the display 170 (e.g., by communicating with the user interface 164). In illustration, the content controller 156 can, based on the answers to the questions received from the user, determine whether to skip a particular sub-part of a present section of the educational content. Responsive to such determination, the content server 156 can skip the particular sub-part of the present section of the educational content 140 and present another sub-part of another section of the educational content 140 to the user 180 via the display 170. In another example, the content controller 156 can, based on the answers to the questions received from the user, determine whether to present a next sub-part of a present section of the educational content. Responsive to such determination, the content server 156 can present the next sub-part of the present section of the educational content to the user via the display.

Figure 4:
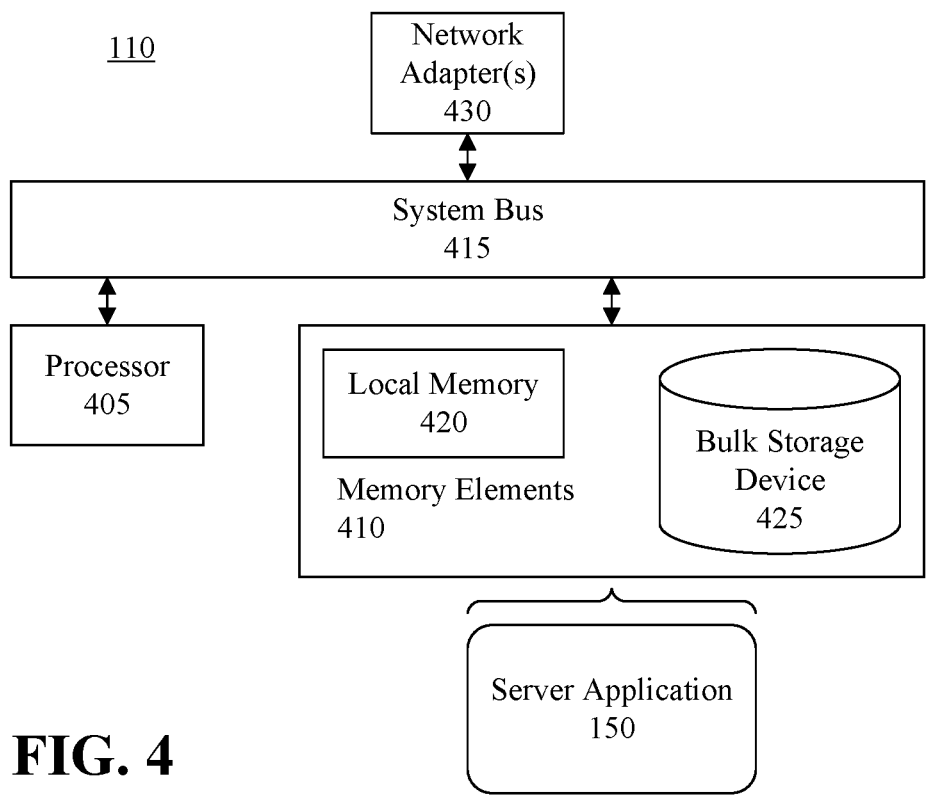
FIG. 4 is a block diagram illustrating example architecture for a server.

FIG. 4 is a block diagram illustrating example architecture for the data processing system 110 of FIG. 1. The data processing system 110 can include at least one processor 405 (e.g., a central processing unit) coupled to memory elements 410 through a system bus 415 or other suitable circuitry. As such, the data processing system 110 can store program code within the memory elements 410. The processor 405 can execute the program code accessed from the memory elements 410 via the system bus 415. It should be appreciated that the data processing system 110 can be implemented in the form of any system including a processor and memory that is capable of performing the functions and/or operations described within this specification. For example, the data processing system 110 can be implemented as a hardware server, a plurality of communicatively linked hardware servers, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 425 during execution.

One or more network adapters 430 can be coupled to data processing system 110 to enable the data processing system 110 to become coupled to client devices, data sources, other systems, computer systems, remote printers, and/or remote storage devices through intervening private or public networks. Modems, cable modems, transceivers, and Ethernet cards are examples of different types of network adapters 430 that can be used with the data processing system 110.

As pictured in FIG. 4, the memory elements 410 can store the components of the data processing system 110, namely the server application 150. Being implemented in the form of executable program code, the server application 150 can be executed by the data processing system 110 and, as such, can be considered part of the data processing system 110. Moreover, the server application 150 includes functional data structures that impart functionality when employed as part of the data processing system 110.

Figure 5:
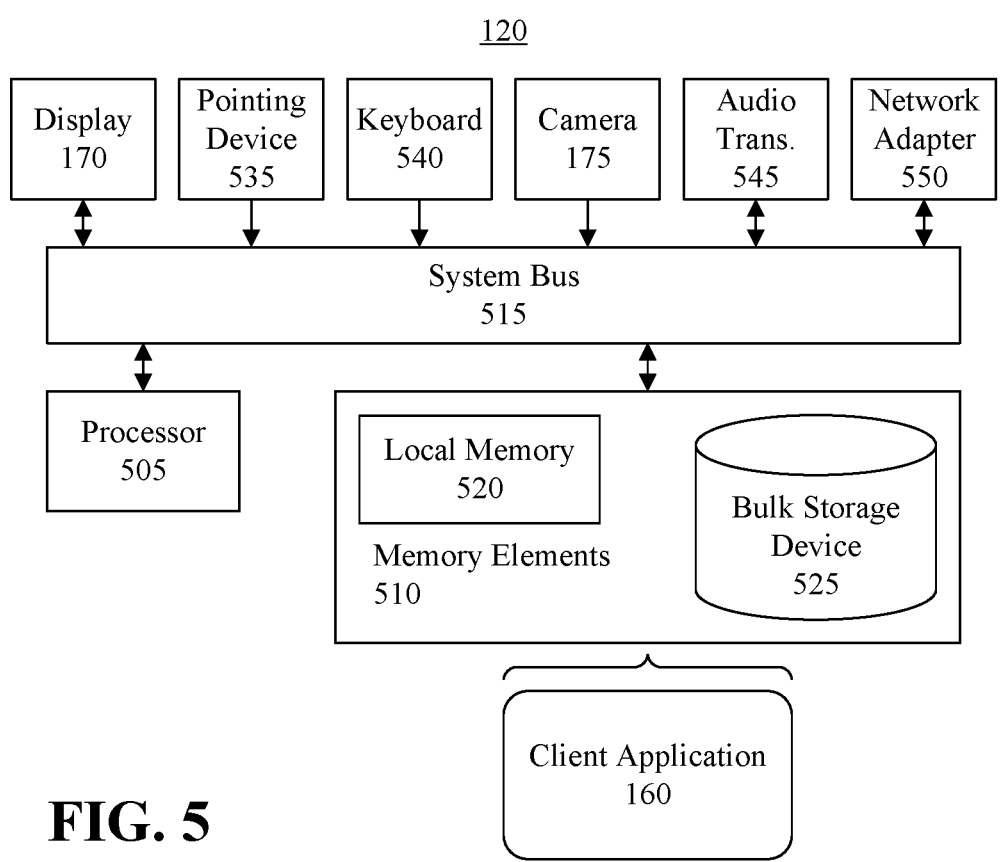
FIG. 5 is a block diagram illustrating example architecture for a client device.

FIG. 5 is a block diagram illustrating example architecture for the client device 120 of FIG. 1. The client device 120 can include at least one processor 505 (e.g., a central processing unit) coupled to memory elements 510 through a system bus 515 or other suitable circuitry. As such, the client device 120 can store program code within the memory elements 510. The processor 505 can execute the program code accessed from the memory elements 510 via the system bus 515. It should be appreciated that the client device 120 can be implemented in the form of any system including a processor and memory that is capable of performing the functions and/or operations described within this specification.

The memory elements 510 can include one or more physical memory devices such as, for example, local memory 520 and one or more bulk storage devices 525. The client device 120 also can include one or more cache memories (not shown) that provide temporary storage of at least some program code in order to reduce the number of times program code must be retrieved from the bulk storage device 525 during execution.

Input/output (I/O) devices such as the display 170, a pointing device 535 and, optionally, a keyboard 540 can be coupled to the client device 120. The I/O devices further can include the camera 175 and at least one audio transducer 545 (e.g., at least one microphone and, optionally, at least one speaker). The I/O devices can be coupled to the client device 120 either directly or through intervening I/O controllers. For example, the display 170 can be coupled to the client device 120 via a graphics processing unit (GPU), which may be a component of the processor 505 or a discrete device. At least one network adapter 550 also can be coupled to client device 120 to enable the client device 120 to become coupled to other systems, computer systems, remote printers, and/or remote storage devices through intervening private or public networks. Modems, cable modems, transceivers, and Ethernet cards are examples of different types of a network adapter 550 that can be used with the client device 120.

As pictured in FIG. 5, the memory elements 510 can store the components of the client device 120, namely the client application 160. Being implemented in the form of executable program code, the client application 160 can be executed by the client device 120 and, as such, can be considered part of the client device 120. Moreover, the client application 160 includes functional data structures that impart functionality when employed as part of the client device 120.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
presenting educational content to a user via a display;
capturing, by a camera, images of the user while the user gazes at the educational content and generating, by the camera, image data;
generating, by processing the image data, user gesture data indicating eye movement of the user while the user gazes at the educational content;
monitoring, in real time, the eye movement of the user while the user gazes at the educational content by analyzing, using at least one processor, the user gesture data;
based, at least in part, on the monitoring the eye movement of the user while the user gazes at the educational content, determining, using the at least one processor, a time when to present assessment content to the user; and
presenting the assessment content to the user at the determined time.

2. The method of claim 1, further comprising:
selecting the assessment content based, at least in part, on the monitoring the eye movement of the user while the user gazes at the educational content.

3. The method of claim 1, further comprising:
monitoring facial expressions of the user while the user gazes at the educational content;
wherein the determining the time when to present assessment content to the user further is based, at least in part, on the monitoring the facial expressions of the user while the user gazes at the educational content.

4. The method of claim 3, further comprising:
selecting the assessment content based, at least in part, on the monitoring the facial expressions of the user while the user gazes at the educational content.

5. The method of claim 1, further comprising:
monitoring emotions expressed by the user while the user gazes at the educational content;
wherein the determining the time when to present assessment content to the user further is based, at least in part, on the monitoring the emotions expressed by the user while the user gazes at the educational content.

6. The method of claim 5, further comprising:
selecting the assessment content based, at least in part, on the monitoring the emotions expressed by the user while the user gazes at the educational content.

7. The method of claim 1, further comprising:
receiving from the user answers to questions presented to the user in the assessment content;
based on the answers to the questions received from the user, determining whether to move to a next section of the educational content; and
responsive to determining to move to the next section of the educational content, skipping remaining sub-parts of the present section of the educational content and presenting the next section of the educational content to the user via the display.

8. The method of claim 1, further comprising:
receiving from the user answers to questions presented to the user in the assessment content;
based on the answers to the questions received from the user, determining whether to skip a particular sub-part of a present section of the educational content; and
responsive to determining to skip the particular sub-part of the present section of the educational content, skipping the particular sub-part of the present section of the educational content and presenting another sub-part of another section of the educational content to the user via the display.

9. The method of claim 1, further comprising:
receiving from the user answers to questions presented to the user in the assessment content;
based on the answers to the questions received from the user, determining whether to present a next sub-part of a present section of the educational content; and
responsive to determining to present the next sub-part of the present section of the educational content, presenting the next sub-part of the present section of the educational content to the user via the display.

10. A system, comprising:
at least one processor programmed to initiate executable operations comprising:
presenting educational content to a user via a display;
capturing, by a camera, images of the user while the user gazes at the educational content and generating, by the camera, image data;
generating, by processing the image data, user gesture data indicating eye movement of the user while the user gazes at the educational content;
monitoring, in real time, eye movement of the user while the user gazes at the educational content by analyzing the user gesture data;
based, at least in part, on the monitoring the eye movement of the user while the user gazes at the educational content, determining a time when to present assessment content to the user; and
presenting the assessment content to the user at the determined time.

11. The system of claim 10, the executable operations further comprising:
selecting the assessment content based, at least in part, on the monitoring the eye movement of the user while the user gazes at the educational content.

12. The system of claim 10, the executable operations further comprising:
monitoring facial expressions of the user while the user gazes at the educational content;
wherein the determining the time when to present assessment content to the user further is based, at least in part, on the monitoring the facial expressions of the user while the user gazes at the educational content.

13. The system of claim 12, the executable operations further comprising:
selecting the assessment content based, at least in part, on the monitoring the facial expressions of the user while the user gazes at the educational content.

14. The system of claim 10, the executable operations further comprising:
monitoring emotions expressed by the user while the user gazes at the educational content;
wherein the determining the time when to present assessment content to the user further is based, at least in part, on the monitoring the emotions expressed by the user while the user gazes at the educational content.

15. The system of claim 14, the executable operations further comprising:
selecting the assessment content based, at least in part, on the monitoring the emotions expressed by the user while the user gazes at the educational content.

16. The system of claim 10, the executable operations further comprising:
    receiving from the user answers to questions presented to the user in the assessment content;
    based on the answers to the questions received from the user, determining whether to move to a next section of the educational content; and
    responsive to determining to move to the next section of the educational content, skipping remaining sub-parts of the present section of the educational content and presenting the next section of the educational content to the user via the display.

17. The system of claim 10, the executable operations further comprising:
    receiving from the user answers to questions presented to the user in the assessment content;
    based on the answers to the questions received from the user, determining whether to skip a particular sub-part of a present section of the educational content; and
    responsive to determining to skip the particular sub-part of the present section of the educational content, skipping the particular sub-part of the present section of the educational content and presenting another sub-part of another section of the educational content to the user via the display.

18. The system of claim 10, the executable operations further comprising:
    receiving from the user answers to questions presented to the user in the assessment content;
    based on the answers to the questions received from the user, determining whether to present a next sub-part of a present section of the educational content; and
    responsive to determining to present the next sub-part of the present section of the educational content, presenting the next sub-part of the present section of the educational content to the user via the display.

19. A computer program product comprising a computer readable storage medium having program code stored thereon, the program code executable by at least one processor to perform a method comprising:
    presenting educational content to a user via a display;
    capturing, by a camera, images of the user while the user gazes at the educational content and generating, by the camera, image data;
    generating, by processing the image data, user gesture data indicating eye movement of the user while the user gazes at the educational content;
    monitoring, in real time, eye movement of the user while the user gazes at the educational content by analyzing the user gesture data;
    based on the monitoring the eye movement of the user while the user gazes at the educational content, determining, by the processor, a time when to present assessment content to the user; and
    presenting the assessment content to the user at the determined time.

20. The computer program product of claim 19, the method further comprising:
    selecting the assessment content based, at least in part, on the monitoring the eye movement of the user while the user gazes at the educational content.

* * * * *